United States Patent [19]
Noda

[11] Patent Number: 5,303,092
[45] Date of Patent: Apr. 12, 1994

[54] MAGNETIC TRANSFER METHOD
[75] Inventor: Makoto Noda, Miyagi, Japan
[73] Assignee: Sony Corporation, Tokyo, Japan
[21] Appl. No.: 664,780
[22] Filed: Mar. 5, 1991
[30] Foreign Application Priority Data
Mar. 6, 1990 [JP] Japan ............................ 2-52619
[51] Int. Cl.$^5$ .............................................. G11B 5/86
[52] U.S. Cl. ........................................ 360/17; 360/16
[58] Field of Search ............... 360/17, 16, 15; 369/84, 369/83

[56] References Cited
U.S. PATENT DOCUMENTS 4,277,806 7/1981 Jeffers et al. ........................ 360/17
4,363,038 12/1982 Fayling ............................... 360/17
4,698,700 10/1987 Shirai ................................. 360/17
5,032,931 7/1991 Suzuki et al. ....................... 360/17

Primary Examiner—Robert J. Pascal
Assistant Examiner—Tan Dinh
Attorney, Agent, or Firm—Hill, Steadman & Simpson

[57] ABSTRACT

A magnetic transfer method for transferring information signals recorded on a master medium onto a slave medium which is placed in pressure contact with the master medium by impressing a bias magnetic field wherein the relationship between the longitudinal remanent coercivity $Hr_1$ of the master medium is equal to or twice the perpendicular remanent coercivity $Hr_2$ of the slave medium.

3 Claims, 1 Drawing Sheet

MAGNETIC TRANSFER METHOD

BACKGROUND OF THE INVENTION

1. Field of the Invention

This invention relates to a magnetic transfer ring method for transferring information signals recorded on a master medium from the master medium to a slave medium.

2. Prior Art

As a method for duplicating a magnetic recording medium, on which video or audio signals are recorded previously, there is known a so-called magnetic transferring method, according to which a slave medium is placed in contact with a pre-recorded master medium, with the magnetic layers thereof in intimate contact with each other, and a bias magnetic field is applied under an optimum contacting state for transferring the magnetic recording on the master medium onto the slave medium.

Heretofore, when transferring magnetic recording by a magnetic transferring method, an apparatus adapter for impressing a bias magnetic field in the longitudinal direction of the medium, as described for example in the Japanese Patent Kokoku Publication No. 52-36004(1977), was used. Recently, there has come to be known an apparatus making use of a transfer drum formed of soft magnetic iron, as shown for example in Japanese Utility Model KOKAI Publication No. 63-44214(1988). This apparatus has an advantage that, since the bias magnetic field is impressed with emphasis in the perpendicular direction, it becomes possible to suppress demagnetization of the master medium by the bias magnetic field. Thus the apparatus is practically employed for preparing a so-called soft tape such as a video tape.

Meanwhile, with the above described magnetic transferring method, which is usually employed for mass production of soft tapes, it is required that the master medium undergoes lesser demagnetization even after repeated transfer operations. Demagnetization of the master medium depends on the bias magnetic field which is applied during the transfer operation. Thus, for suppressing demagnetization of the master medium, it is desired that the strength of the bias magnetic field necessary for the transfer operation be as low as practicable.

On the other hand, coercivity $Hc_2$ of the slave medium is proportional to the strength of the bias magnetic field to be applied for the transfer operation. Thus, for suppressing demagnetization of the master medium and simultaneously increasing the transfer efficiency, it was felt that coercivity $Hc_2$ of the slave medium and coercivity $Hc_1$ of the master medium be related to each other by the formula (1)

$$\frac{\text{coercivity } Hc_1 \text{ of the master medium}}{\text{coercivity } Hc_2 \text{ of the slave medium}} \quad (1)$$

However, considering the anti-magnetic field in the perpendicular direction of the medium, coercivity in the longitudinal direction of the medium (longitudinal coercivity) is not critical. More specifically, in a medium having a longitudinal rectangular ratio $R_s$ closer to unity and lower switching field distribution (SFD), such as, for example, a Co-containing $\gamma$-$Fe_2O_3$ tape or metal tape, it may occur that, while the longitudinal coercivity of the medium and the strength of the longitudinal reverse magnetizing field thereof coincide fairly well with each other, the perpendicular coercivity of the medium and the strength of perpendicular reverse magnetizing field thereof differ significantly from each other. That is, with the magnetic transferring method, when the bias magnetic field is impressed in the longitudinal direction, if the relation $$\frac{\text{longitudinal coercivity of the master medium}}{\text{longitudinal coercivity of the slave medium}} \geq 2.5$$

is satisfied, it becomes possible to reduce demagnetization of the master medium by the bias magnetic field to thereby obtain satisfactory characteristics. However, through our repeated experiments, it has now been found that, when the bias magnetic field is impressed in the perpendicular direction, demagnetization of the master medium can not necessarily be suppressed even when a master medium-slave medium combination satisfy the relation $$\frac{\text{perpendicular coercivity of the master medium}}{\text{perpendicular coercivity of the slave medium}} \geq 2.5$$

or the relation $$\frac{\text{longitudinal coercivity of the master medium}}{\text{perpendicular coercivity of the slave medium}} \geq 2.5$$

is used and an optimum bias magnetic field for the slave medium is impressed for the transfer operation. Thus, with the magnetic transferring method in which the bias magnetic field is impressed in the perpendicular direction, a new information concerning the condition to be satisfied by the master medium and the slave medium is necessary for suppressing demagnetization of the master medium and improving the transfer efficiency.

SUMMARY OF THE INVENTION

In view of the foregoing, it is a principal object of the present invention to provide a magnetic transferring method whereby, in carrying out the transfer operation under impression of the bias magnetic field with emphasis in the perpendicular direction, demagnetization of the master medium may be diminished and a satisfactory transfer reproducing output of the slave medium may be obtained even after repeated transfer operations.

As a result of long experimentation the present inventors have found that, in a magnetic transfer operation in which a bias magnetic field is impressed in the perpendicular direction, if a master medium-slave medium combination, which is so selected that the perpendicular remanent coercivity $Hr_2$ of the slave medium uncompensated for anti-magnetic fields is not more than one half the longitudinal remanent coercivity $Hr_1$ of the master medium, is employed, it becomes possible to suppress demagnetization of the master medium as well as to produce a superior transfer reproducing output of the slave medium even after repeated transfer operations.

The present invention provides a magnetic transfer method for transferring information signals recorded on a master medium onto a slave medium placed in pressure contact with the master medium, by impressing a bias magnetic field with emphasis in the perpendicular direction to said master medium and the slave medium, comprising maintaining the relation between the remanent coercivity $Hr_1$ of the master medium and the perpendicular remanent coercivity $Hr_2$ of the slave medium so as to satisfy the formula $$Hr_1/Hr_2 \geq 2.0 \quad (2)$$

wherein the perpendicular remanent coercivity $Hr_2$ of the slave medium is not compensated for anti-magnetizing fields.

With the magnetic transferring method of the present invention, demagnetization of the master medium by the longitudinal component of the bias magnetic field may be suppressed by setting the longitudinal remanent coercivity $Hr_1$ of the master medium so as to be equal to twice or more of the perpendicular remanent coercivity $Hr_2$ of the slave medium uncompensated for anti-magnetizing fields.

With the slave medium, the bias magnetic field necessary for transfer may be reduced because the perpendicular remanent coercivity $Hr_2$ uncompensated for anti-magnetizing fields satisfies the aforementioned condition.

Thus the present invention provides a magnetic transferring method which enables demagnetization of the master medium to be suppressed significantly, while enabling an excellent transfer reproducing output of the slave medium to be obtained even after repeated transfer operations.

DETAILED DESCRIPTION OF THE INVENTION

Figure 1:
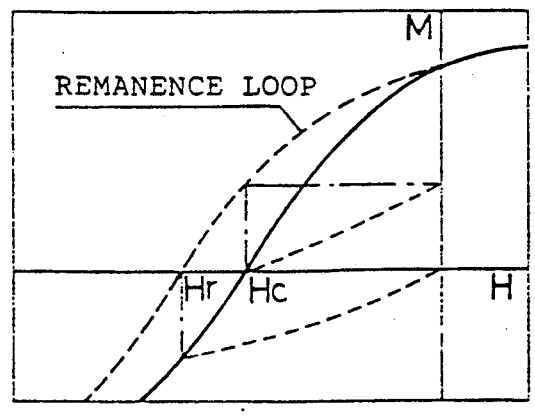
FIG. 1 is a diagram for illustrating the remanence loop.

In general, remanence coercivity Hr means a coercive force as found from a remanence loop of a magnetic hysteresis curve, as indicated by broken lines in FIG. 1. By "remanent coercivity" Hr is meant the strength of a reverse external magnetic field which is applied to a recording medium until residual magnetization, that is magnetization remaining in the medium after an external magnetic field has been applied to the medium until saturation magnetization Ms is reached, is reduced to zero.

More specifically, referring to FIG. 1, an M-H loop is shown by a solid line and the value of magnetization M of the medium, magnetized up to saturation magnetization Ms, is Mr at H=0 (remanent or residual magnetization), becoming zero only when the strength reverse external magnetic field is Hc. However, if the reverse external magnetic field is removed, the value of magnetization M is increased, as shown by broken line, until it assumes a positive value $M_1$ at H=0.

If however the reverse external magnetic field is impressed until the above defined remanent coercivity Hr is searched, the value of magnetization M becomes zero (M=0) when the external magnetic field is removed (H=0).

According to the present invention, magnetic transfer is performed by applying a bias magnetic field in the perpendicular direction of the medium by using a combination of a master medium and a slave medium which will satisfy the above formula (2).

The relation according to the above formula (2) has been derived by the undermentioned reason. First, the case of impressing a bias magnetic field to the master medium with emphasis in the perpendicular direction is considered. A metal tape usually employed in a master medium has a higher saturation magnetization in the order of 3,000 gauss. For this reason, a larger anti-magnetizing field is produced in the master medium, so that the strength of the bias magnetic field impressed to the master medium is significantly reduced. On the other hand, the strength of the bias magnetic field, applied by a ferrite head, for example, is 12,000 oersted at most, so that demagnetization of the master medium by the perpendicular component of the bias magnetic field is extremely low. That is, demagnetization of the master medium depends largely on the longitudinal component of the bias magnetic field applied to the master medium. Thus, for suppressing demagnetization of the master medium, it is necessary to reduce the strength of the longitudinal component of the bias magnetic field. For this reason, the master medium having a larger reverse magnetizing field, that is a larger remanent coercivity $Hr_1$, in the longitudinal direction, is employed.

Next, considering the case in which a bias magnetic field is applied to the slave medium in the perpendicular direction, a reverse magnetic field in the perpendicular direction with respect to the slave medium, that is a bias magnetic field in the perpendicular direction in association with the remanent coercivity $Hr_2$ in the perpendicular direction of the slave medium, becomes necessary. For this reason, a slave medium which may be subject to a lesser reverse magnetic field in the perpendicular direction, that is which has a lesser remanent coercivity $Hr_2$ in the perpendicular direction, needs to be employed.

The remanent coercivities $Hr_1$ and $Hr_2$ are affected largely by such factors as the coercivity Hc of the magnetic powders, distribution of the coercive force Hc, interaction among the particles, degree of orientation or saturation magnetization, and are not necessarily coincident with the coercivity Hc, and may even differ significantly from the coercivity Hc of the medium in the usual sense of the term. Thus, by defining the master medium and the slave medium as shown by the formula (2) by using the remanent coercivities $Hr_1$ and $Hr_2$, it becomes possible to reduce the demagnetization of the master medium due to the bias magnetic field to provide for a satisfactory transfer reproducing output of the slave medium even after the transfer operations repeated a number of times.

As the slave medium, a magnetic recording medium including a magnetic layer consisting mainly of hexagonal ferrite magnetic powders and a binder may be employed.

The hexagonal ferrite magnetic powders may be fine particles of hexagonal ferrite represented by the formula $$MO \cdot n(Fe_2O_3) \quad (3)$$

wherein M stands for at least one of Ba, Sr or Ca and n stands for 5 to 6. For controlling coercivity, at least one of Co, Ti, Ni, Mn, Cu, Zn, In, Ge or Nb may be added so that Fe of the hexagonal ferrite is partially replaced by one or more of these elements. For example, in a magnetoplumbite type barium ferrite in which M in the formula (3) is Ba, if Fe is partially replaced by one or more of the above elements, the resulting composition is shown by the formula $$BaO \cdot n(Fe_{1-m}X_m)_2O_3 \quad (4)$$

wherein X stands for at least one of Co, Ti, Ni, Mn, Cu, Zn, In, Ge or Nb, m stands for 0 to 0.2 and n stands for 5 to 6.

For producing the hexagonal ferrite magnetic powders, the flux method, the glass crystallization method, the hydrothermal synthesis method or the co-precipitation method, may be employed. However, the present invention is not limited to there methods, but any other methods so far known in the art may be employed.

When used as magnetic powders for a magnetic recording medium, the aforementioned hexagonal ferrite magnetic powders are kneaded with a resin binder or an organic solvent to give a magnetic paint which is then applied on a non-magnetic carrier or base to give a magnetic layer.

As the resin binder, any of the commonly employed resin binders may be employed. Examples of these resin binders include a vinyl chloride-vinyl acetate copolymer, a vinyl chloride-vinylidene chloride copolymer, a vinyl chloride-acrylonitrile copolymer, an acrylic ester-acrylonitrile copolymer, a thermoplastic polyurethane elastomer, polyvinyl fluoride, vinylidene chloride-acrylonitrile copolymer, butadiene-acrylonitrile copolymer, polyamide resin, polyvinyl butyral, cellulose derivatives, polyester resins, synthetic rubber resins, such as polybutadiene, phenol resins, epoxy resins, heat curable polyurethane, resins, melamine resins, alkyd resins, silicone resins, acrylic reactive resins, epoxypolyamide resins, nitrocellulose-melamine resins, a high molecular weight polyester resin-isocyanate prepolymer mixture, urea formaldehyde resins, a low molecular weight glycol/high molecular weight diol/triphenylmethane trisocyanate mixture, polyamine resins, or mixtures thereof.

Resin binders having hydrophilic polar groups may also be employed for improving dispersibility of the magnetic powders.

More specifically, polyurethane resins, polyester resins, vinyl chloride-vinyl acetate copolymers, vinylidene chloride copolymers, acrylic ester copolymers or butadiene copolymers, into which hydrophilic polar groups selected from the groups consisting of $-SO_3M$, $-O-SO_3M$, $-COOM$ and $-P(OM')_2$, wherein M stands for a hydrogen atom or an alkali metal and M' stands for a hydrogen atom, an alkali metal or a hydrocarbon residue, may be employed.

As the organic solvents, any of the commonly used organic solvents may be employed. Examples of the organic solvents include ketone base solvents, such as acetone, methylethylketone or cyclohexanone, ester base solvents, such as methyl acetate, ethyl acetate, butyl acetate, ethyl lactate or acetic acid glycol monoethylether, glycol ether base solvents, such as glycol dimethylether, glycol monoethylether or dioxane, aromatic hydrocarbon base solvents, such as benzene, toluene or xylene, chlorinated hydrocarbon base solvents, such as methylene chloride, ethylene chloride, carbon tetrachloride, chloroform, ethylene chlorohydrin or dichlorobenzene.

In addition to these resin binders, lubricants, guiders or dispersants may also be added to the magnetic layer. These agents may be mixed into or applied to the surface of the magnetic layer.

The magnetic paint, obtained by kneading the hexagonal ferrite magnetic powders, resin binders or the like, as mentioned above, is applied on a non-magnetic carrier or base to provide the magnetic layer. Examples of the materials for the non-magnetic carrier or base include polyesters such as polyethylene terephthalate, polyolefins such as polyethylene or polypropylene, cellulose derivatives such as cellulose triacetate, cellulose diacetate or cellulose acetate butylate, vinyl resins such as polyvinyl chloride or polyvinylidene chloride, plastics such as polycarbonate, polyimide or polyamideimide, light metals such as aluminum or titanum alloys, and ceramics, such as alumina glass.

The non-magnetic carrier may be in any desired form, such as in the form of a film sheet, disc, card or a drum.

Magnetic signals are transferred from the master medium to the slave medium by the magnetic field transferring method. Magnetic transfer apparatus employed for magnetic transfer of the magnetic signals include those of the roller pressing type or the pneumatic pressing type. If a transfer drum, formed of a high permeability material, for example, is used in the above mentioned transfer apparatus, the bias magnetic field may be applied with emphasis in the perpendicular direction.

As the master medium, a so-called metal magnetic recording medium in which the magnetic layer is formed by high coercivity needle-like magnetic metal powders, or a so-called evaporated magnetic recording medium, in which the magnetic layer is formed by evaporating a ferromagnetic thin metal film in vacuum, is preferably employed.

The longitudinal remanent coercive force $Hr_1$ of the master medium is preferably 1400 oersted or more. This range has been found to be effective to suppress demagnetization of the master magnetic recording medium which is in keeping with the practically employed bias magnetic field region.

The present invention will be explained with reference to more specific test results. It is to be noted that the present invention is not limited to these Examples.

Preparation of Slave Medium

Using three different barium ferrite magnetic powders a, b and c, having different values of the X-ray particle size, aspect ratio and coercivity Hc, as shown in Table 1, five different types of the slave media A to E were prepared in accordance with the procedure which will be explained subsequently.

TABLE 1

| | X-ray particle size [Å] | aspect ratio | coercivity Hc [Oe] |
|---|---|---|---|
| magnetic powders a | 700 | 5 | 700 |
| magnetic powders b | 580 | 3 | 650 |
| magnetic powders c | 570 | 3 | 660 |

| Composition of the Magnetic Paint (in parts by weight) | |
|---|---|
| barium ferrite magnetic powders a to c | 100 |
| binder resin | 15 |
| grinder ($Al_2O_3$) | 5 |
| carbon | 2 |
| methylethylketone | 110 |
| toluene | 50 |
| cyclohexanone | 50 |

These materials were dispersed and mixed together in a ball mill, added to by a curing agent and again mixed together to produce a magnetic paint.

This magnetic paint was applied to a base film to produce a magnetic layer which was then processed by perpendicular orientation, dried, calendered and cured to a finished magnetic layer. The resulting base film-magnetic paint assembly was sliced to produce sample types each 3.0 μm thick.

The perpendicular rectangular ratio Rs(%), saturation magnetization Ms(emu/cc), perpendicular coercivity $Hc_2$ (oersted) and perpendicular remanent coercivity $Hr_2$ (oersted) are shown in Table 2.

TABLE 2

| | | slave medium characteristics | | |
|---|---|---|---|---|
| | magnetic powders used | perpendicular rectangular ratio Rs | Ms | perpendicular coercivity $Hc_2$ | perpendicular remanent coercivity $Hr_2$ |
| slave medium A | a | 0.80 | 120 | 750 | 820 |
| slave medium B | a | 0.54 | 120 | 760 | 1140 |
| slave medium C | b | 0.70 | 130 | 770 | 920 |
| slave medium D | b | 0.58 | 129 | 750 | 1080 |
| slave medium E | c | 0.71 | 160 | 720 | 1300 |

Preparation of Master Medium

Using needle-like magnetic metal powders d and e, having the coercivities of 2000 oersted and 1700 oersted, respectively, master media F and G were prepared in accordance with the procedure which will be explained subsequently.

| Composition of Magnetic Paint (in parts by weight) | |
|---|---|
| needle-like magnetic metal powders d and e | 100 |
| binder resin | 20 |
| grinder ($Al_2O_3$) | 10 |
| carbon | 5 |
| methylethylketone | 110 |
| toluene | 50 |
| cyclohexanone | 50 |

The above materials were dispersed and mixed together in a ball mill, added to by a curing agent and again mixed together to produce a magnetic paint.

This magnetic paint was applied to a base film to form a magnetic layer which was then processed by longitudinal orientation. The resulting magnetic layer-base film assembly was dried, calendered and cured to a finished magnetic layer. The cured assembly was sliced to produce sample tapes each 4.0 μm thick.

The longitudinal rectangular ratio Rs(%), longitudinal coercivity $Hc_1$ (Oe) and the longitudinal remanent coercivity $Hr_1$ (Oe) of each of the master media F and G are shown in Table 3.

TABLE 3

| | magnetic powders used | master medium characteristics | |
|---|---|---|---|
| | | longitudinal coercivity $Hc_1$ | perpendicular remanent coercivity $Hr_1$ |
| master medium F | d | 2100 | 2170 |
| master medium G | e | 1710 | 1770 |

EXAMPLE 1 TO 4

Using the combinations of the slave media A, C and D and the master media F and G, as shown in Table 4, magnetic recording on each of the master media F and G previously recorded thereon by a magnetic head was transferred onto the slave media A, C and D in accordance with a magnetic transfer method.

COMPARATIVE EXAMPLES 1 TO 3

Using the combinations of the slave media A, C and E and the master media F and G, as shown in Table 4, magnetic recording on each of the master media F and G previously recorded thereon by a magnetic head was transferred onto the slave media A, C and E in accordance with a magnetic transfer method.

TABLE 4

| | Slave Medium Types | Master Medium Types |
|---|---|---|
| Ex. 1 | A | F |
| Ex. 2 | C | F |
| Ex. 3 | A | G |
| Ex. 4 | D | F |
| Comp. Ex. 1 | B | F |
| Comp. Ex. 2 | C | G |
| Comp. Ex. 3 | E | G |

The recording by the magnetic head was performed using a metal-in-gap head with the track width of 22 μm, gap length of 0.25 μm and the number being the turns of the coil of 23 and by an optimum recording current of the relative velocity of 3.133 m/second and the frequency f of 4.7 MHz.

The magnetic transfer was performed at a rate of 4 m/sec by recording a mirror surface pattern on a master medium by a magnetic head, pressing the master medium against the slave medium by air and impressing a bias magnetic field so that the transfer output become maximum.

Figure 2:
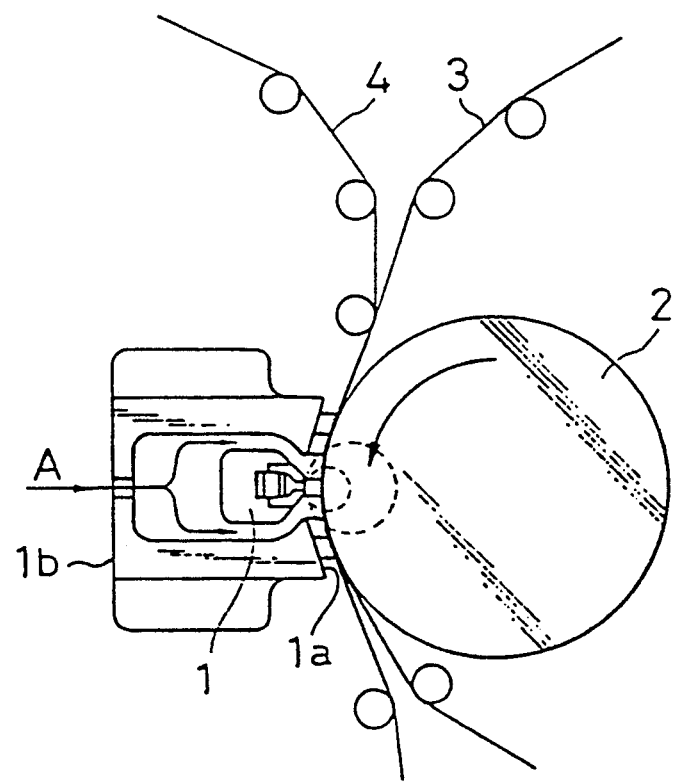
FIG. 2 is a schematic view for illustrating air pressuring system apparatus employed for the magnetic field transferring method.

For magnetic transfer, an air pressing transfer apparatus was used. As shown in FIG. 2, the above air pressing type transfer apparatus is comprised of a ferrite bias head 1 with a gap length of 200 μm and the number of turns of the coil of 35 and a transfer head 2 of soft magnetic iron placed in opposition to the bias head. By the air pressing type apparatus is meant the apparatus in which air shown by an arrow A in FIG. 1 is introduced from the rear side 1b of the bias head 1 so as to be blown under a predetermined pressure against the lateral surface of the transfer drum 2 from the adjacent forward side 1a of the bias head 1 for pressing the master magnetic recording medium 3 and the slave magnetic recording medium 4 against the lateral side of the transfer drum 2. In this manner, while the master magnetic recording medium 3 and the slave magnetic recording medium 4 were pressured together under the pressure of the air blown out from the bias head 1, a bias magnetic current with the bias frequency f of 200 KHz was supplied to the bias head 1 to produce the bias magnetic field to effect magnetic transfer.

Analyses were made of the relationship between the longitudinal remanent coercivity $Hr_1$ of the master medium and the perpendicular remanent coercivity $Hr_2$ of the slave medium and into demagnetization of the master medium as well as decrease of the transfer reproducing output of the slave medium caused by repeated transfers.

Table 5 shows the results, as measured with a spectrum analyzer, of the demagnetization of the master medium and the transfer reproducing output (frequency $f=10$ MHz) of the slave medium after the transfer operation had been performed 100 times with the optimum bias current from the master medium to the slave medium.

TABLE 5

| | $Hr_1/$ $Hr_2$ | $Hc_1/$ $Hc_2$ | optimum bias current [A] | demagnetization of master medium [dB] | reproducing output of slave medium [dB] |
|---|---|---|---|---|---|
| Ex. 1 | 2.6 | 2.8 | 1.5 | −0.5 | 0 |
| Ex. 2 | 2.4 | 2.2 | 1.6 | −0.5 | 0 |
| Ex. 3 | 2.2 | 2.3 | 1.5 | −0.7 | 0 |
| Ex. 4 | 2.0 | 2.8 | 1.8 | −1.5 | 0 |
| Comp. Ex. 1 | 1.8 | 2.8 | 1.9 | −2.5 | −0.5 |
| Comp. Ex. 2 | 1.6 | 2.4 | 1.8 | −4.0 | −0.9 |
| Comp. Ex. 3 | 1.4 | 2.4 | 2.2 | −6.0 | −1.5 |

It is noted that, in Table 5, the value of the demagnetization of the master medium is obtained when the output from the master medium prior to transfer is set to be equal to 0 dB, while the value of the reproducing output of the slave medium is obtained when the reproducing output of the slave medium at the time of the first transfer operation is set to be equal to 0 dB.

It is seen from Table 5 that, with the Examples 1 to 4, in which the relation $Hr_1/Hr_2 \geq 2.0$ holds between the longitudinal remanent coercivity $Hr_1$ of the master medium and the perpendicular remanent coercivity $Hr_2$ of the slave medium, demagnetization of the master medium and the resulting decrease in the transfer reproducing output of the slave medium occur to a lesser extent even when the transfer operation is repeatedly performed. Conversely, with the Comparative Examples 1 to 3, demagnetization of the master medium and decrease in the transfer reproducing output of the slave medium occur to a larger extent than with the Examples 1 to 4.

Also, with the Examples 1 to 4 and the Comparative Examples 1 to 3, the coercivity $Hc_2$ of the slave medium is not more than 1/2.5 of the coercivity $Hc_1$ of the master medium. With the Comparative Examples 1 to 3, demagnetization of the master medium or decrease in the transfer reproducing output of the slave medium is not suppressed with the Comparative Examples 1 to 3. Also, while $Hc_1/Hc_2=2.8$ with the Examples 1 and 4 and with the Comparative Example 1, deterioration in the characteristics of the master medium or the slave medium is severe with the Comparative Example 1. It is thus apparent that analyses into the relation between the coercivity $Hc_2$ of the slave medium and the coercivity $Hc_1$ of the master medium as in the conventional practice are not necessarily effective in suppressing demagnetization of the master medium or decrease of the transfer reproducing output of the slave medium.

It is also seen from comparison of the Examples 1 to 4 that the larger the value of the ratio $Hr_1/Hr_2$, the lower tends to be the demagnetization of the master medium.

What is claimed is:

1. A magnetic transfer method for transferring information signals recorded on a master medium onto a slave medium placed in pressure contact with the master medium, by impressing a bias magnetic field with emphasis in the perpendicular direction to said master medium and the slave medium, comprising the step of maintaining the relation between the longitudinal remanent coercivity $Hr_1$ of the master medium and the perpendicular remanent coercivity $Hr_2$ of the slave medium so as to satisfy the formula $Hr_1/Hr_2 \geq 2.0$ wherein the perpendicular remanent coercivity $Hr_2$ of the slave medium is not compensated for anti-magnetizing fields.

2. The magnetic transfer method according to claim 1 wherein longitudinal remanent coercivity $Hr_1$ of the master medium is at least 1400 oersted.

3. The magnetic transfer method according to claim 1 wherein said slave medium is a magnetic recording medium carrying a magnetic layer consisting essentially of hexagonal ferrite magnetic powders and a binder.

* * * * *